United States Patent [19]

Morichika et al.

[11] Patent Number: 5,013,616
[45] Date of Patent: May 7, 1991

[54] MAGNETIC RECORDING MEDIUM OF THIN METAL FILM TYPE

[75] Inventors: Toshiaki Morichika; Toshio Tani; Nobuhiko Tanaka; Tatsuhiko Kadowaki, all of Osaka, Japan

[73] Assignee: Kubota Ltd., Osaka, Japan

[21] Appl. No.: 581,266

[22] Filed: Sep. 12, 1990

Related U.S. Application Data

[63] Continuation of Ser. No. 215,659, Jul. 6, 1988, abandoned.

[30] Foreign Application Priority Data

Jul. 7, 1988 [JP] Japan .................................. 62-170547

[51] Int. Cl.$^5$ .............................................. G11B 23/00
[52] U.S. Cl. ................................. 428/694; 428/611; 428/678; 428/900; 428/928
[58] Field of Search .............. 428/694, 900, 611, 678, 428/681, 428

[56] References Cited

U.S. PATENT DOCUMENTS

| | | | |
|---|---|---|---|
| 4,385,098 | 5/1983 | Sugita et al. | 428/628 |
| 4,517,257 | 5/1985 | Shimizu et al. | 428/694 |
| 4,639,815 | 1/1987 | Arai et al. | 428/681 |
| 4,746,559 | 5/1988 | Nishikawa et al. | 428/694 |

FOREIGN PATENT DOCUMENTS 59-72653 4/1984 Japan .

Primary Examiner—Paul J. Thibodeau
Attorney, Agent, or Firm—Armstrong, Nikaido, Marmelstein, Kubovcik & Murray

[57] ABSTRACT

A magnetic recording medium having a low noise level and comprising a magnetic film made of a Co-Ni-Cr-P alloy. The Co-Ni-Cr-P alloy has a composition represented by the formula $$(Co_{100-a}Ni_a)_{100-b-c}Cr_bP_c$$

wherein a, b and c each represent atomic percent, and $3 \leq a \leq 40$, $2 \leq b \leq 10$ and $2 \leq c \leq 7$.

1 Claim, 5 Drawing Sheets

MAGNETIC RECORDING MEDIUM OF THIN METAL FILM TYPE

This application is a continuation of application Ser. No. 215,659 filed on July 6, 1988 now abandoned.

FIELD OF THE INVENTION

The present invention relates to a magnetic recording medium in the form of a thin metal film and suited to high-density magnetic recording.

BACKGROUND OF THE INVENTION

With improvements in recording-reproduction methods, magnetic heads, magnetic recording media, etc. for use in magnetic recording systems, rapid advances have been made in the field of magnetic recording techniques in recent years for magnetic recording with an increased density.

To provide improved magnetic recording media for high-density recording, efforts have been made chiefly to give an increased coercive force (Hc) or increased residual magnetic flux density (Br) to the magnetic film and to reduce the thickness of the medium to the greatest possible extent. For example, in the case of hard discs for use in Winchester recording systems wherein the head and disc are sealed off, coating-type recording media which comprise a magnetic film composed of a highly magnetic powder and an organic binder and formed on a nonmagnetic substrate have been changed over to media of the thin metal film which comprise a magnetic film in the form of a thin metal film and having higher magnetic characteristics for high-density recording.

The magnetic recording medium of the thin metal film is prepared by coating an aluminum alloy or like nonmagnetic substrate with a film having a specified thickness of an iron family element, alloy of such elements, or an alloy composed of an iron family element or alloy of such elements and an element other than the iron family elements by vacuum evaporation, sputtering, ion-beam deposition or like method. The composition of the thin metal film is selectively determined in view of the desired magnetic properties, recording-reproduction characteristics, durability (chiefly weather resistance), etc. as evaluated collectively. Generally, Co, Co—Ni alloy or Co—Fe alloy is primarily used.

The magnetic recording media of the thin metal film prepared using such a material possess excellent magnetic characteristics for high-density recording but are not always satisfactory in noise characteristics. Accordingly it has been desired to provide a magnetic recording medium which is amenable to high-density recording and outstanding in noise characteristics.

SUMMARY OF THE INVENTION

The main object of the present invention is to provide a magnetic recording medium which is lowered in noise level and which nevertheless retains the excellent magnetic characteristics of Co—Ni alloy.

The magnetic recording medium of the present invention is characterized in that it comprises a thin magnetic film prepared from a Co—Ni—Cr—P alloy. The Co—Ni—Cr—P alloy is a Co—Ni alloy having both Cr and P elements incorporated therein and has a composition represented by the formula $$(Co_{100-a}Ni_a)_{100-b-c}Cr_bP_c$$

wherein a, b and c are each an atomic percent, and $3 \leq a \leq 40$, $2 \leq b \leq 10$ and $2 \leq c \leq 7$.

The magnetic film composed of the Co—Ni—Cr—P alloy of the composition represented by the formula substantially retains the excellent magnetic characteristics of Co—Ni alloy magnetic films and yet possesses outstanding noise characteristics which can not be realized by the magnetic films of Co—Ni alloy

DETAILED DESCRIPTION OF THE INVENTION

The magnetic recording medium of the present invention includes a thin magnetic film comprising a Co—Ni—Cr—P alloy. The composition of this alloy is represented by the formula

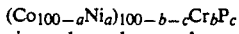

$$(Co_{100-a}Ni_a)_{100-b-c}Cr_bP_c$$

wherein a, b and c each represent atomic percent, and $3 \leq a \leq 40$, $2 \leq b \leq 10$ and $2 \leq c \leq 7$.

In the above formula, the value a is in the range of from 3 to 40 because when the value is in this range, the alloy retains the excellent magnetic characteristics, especially high coercive force Hc and high residual magnetic flux density Br, of Co—Ni alloys. The value b is 2 to 10, and the value c is 2 to 7 because when the values are in the respective ranges, a remarkably lowered noise level can be realized owing to the conjoint presence of Cr and P.

The Co—Ni—Cr—P alloy magnetic film of the present invention can be formed on a nonmagnetic substrate by various methods such as sputtering, ion plating and vacuum evaporation. The substrate can be of any desired material or shape insofar as it is nonmagnetic.

The thin metal film type magnetic recording medium of the present invention is useful as a magnetic disc and various other magnetic recording media including magnetic drum, magnetic tape and magnetic sheet. These media can be prepared by suitable known methods.

Figure 9:
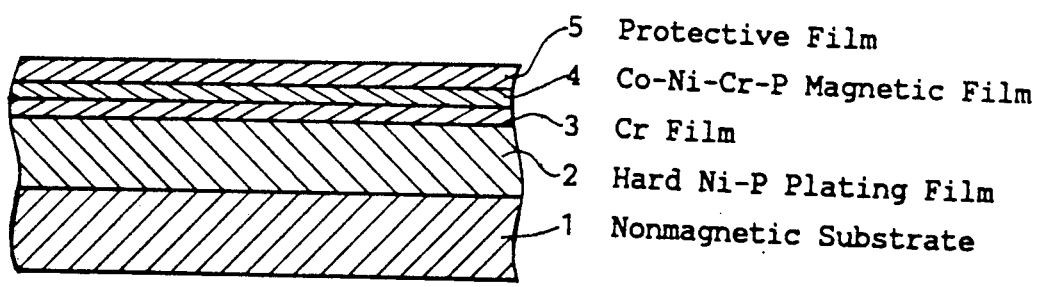
FIG. 9 is a sectional view showing a magnetic disc embodying the invention and serving as a magnetic recording medium.

With reference to FIG. 9, an example is given below wherein a magnetic disc incorporating a Co—Ni—Cr—P alloy magnetic film of the invention is prepared. However, the application of the magnetic film of the invention is in no way limited to this example.

FIG. 9 shows the sectional structure of the longitudinal magnetic recording disc. A hard Ni—P plating film 2, 15 to 25 μm in thickness, is formed over the surface of an aluminum alloy substrate 1 by electroless plating. The surface of the film 2 is polished with high precision. Next, the polished surface is coated with a Cr film 3, about 1300 to about 5000 angstroms in thickness, by sputtering. The Cr film serves as a ground layer for making the magnetic film to be formed thereon magnetically anisotropic. Preferably, the sputtering chamber is maintained at an Ar gas pressure of about $1 \times 10^{-3}$ to about $5 \times 10^{-2}$ torr. Subsequently, a magnetic film 4 of Co—Ni—Cr—P alloy having the above-mentioned composition is formed over the Cr film 3 similarly by sputtering to a thickness of about 500 to about 2000 angstroms. A carbonaceous protective film 5 about 150 to about 600 angstroms in thickness and having lubricity and abrasion resistance is further formed over the magnetic film 4 to protect the film 4 from wear or damage. In this way, a magnetic disc can be obtained which has a multi-layer structure.

When required, a Cr film, about 100 to about 500 angstroms in thickness, can be provided between the magnetic film 4 and the carbonaceous protective film 5 to give the disc enhanced weather resistance. When forming the Co—Ni—Cr—P alloy magnetic film by sputtering, the component metal elements of the magnetic film or the alloy thereof may be used as the target.

Magnetic discs were prepared and checked for noise characteristics for comparative evaluation as will be described below. These discs include magnetic discs incorporating a magnetic film of the invention and those including a conventional magnetic film or a magnetic film prepared for comparison.

(1) Preparation of magnetic discs for testing

The surface of an aluminum alloy substrate (130 mm in outside diameter, 40 mm in inside diameter and 1.9 mm in thickness) was coated with an Ni—P film (20 micrometers in thickness) by electroless plating, and the surface of the film was polished with high precision. A Cr film, magnetic film and carbonaceous film (for protecting the magnetic film, 300 angstroms in thickness) were then formed in this order over the polished surface by magnetron sputtering (Ar gas pressure: $2\times10^{-2}$ torr) to obtain a magnetic disc for testing. Thus, magnetic discs Nos. 1 to 8 were fabricated in the same manner as above except that different magnetic films were prepared. Table 1 shows the composition, Br·δ value (Gμ) and coercive force Hc (Oe) of the magnetic films. Discs Nos. 1 to 5 are examples of the invention, No. 6 is a conventional example, and Nos. 7 and 8 are comparative examples prepared for the comparison of performance with the invention. The magnetic film of the conventional example, No. 6 is one widely used in hard discs of the sputtering type and is made of a Co—Ni alloy which contains neither of Cr and P. The magnetic films of the comparative examples, Nos. 7 and 8 are a Co—Ni—Cr alloy, i.e. a Co—Ni alloy containing Cr only, and a Co—Ni—P alloy, i.e. a Co—Ni alloy containing P only, respectively.

For the proper evaluation of the noise characteristics of the magnetic discs, it is thought reasonable to make the discs approximately equivalent to one another in coercive force Hc and the product Br·δ of the residual magnetic flux density Br and the film thickness δ. Accordingly, the thickness of the Cr film and that of the magnetic film of each magnetic disc were so determined as to give a coercive force of about 750 Oe and a Br·δ value of about 600 Gμ as listed in Table 1.

TABLE 1

Figure 1:
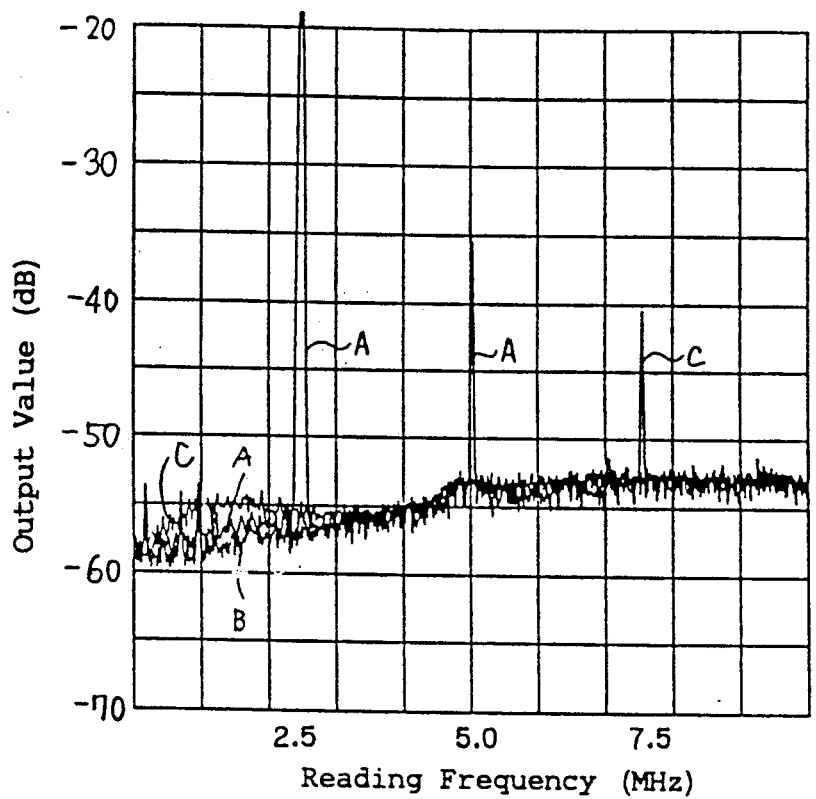
FIGS. 1 to 5 are graphs showing the noise characteristics of magnetic discs embodying the invention and serving as magnetic recording media.
Figure 2:
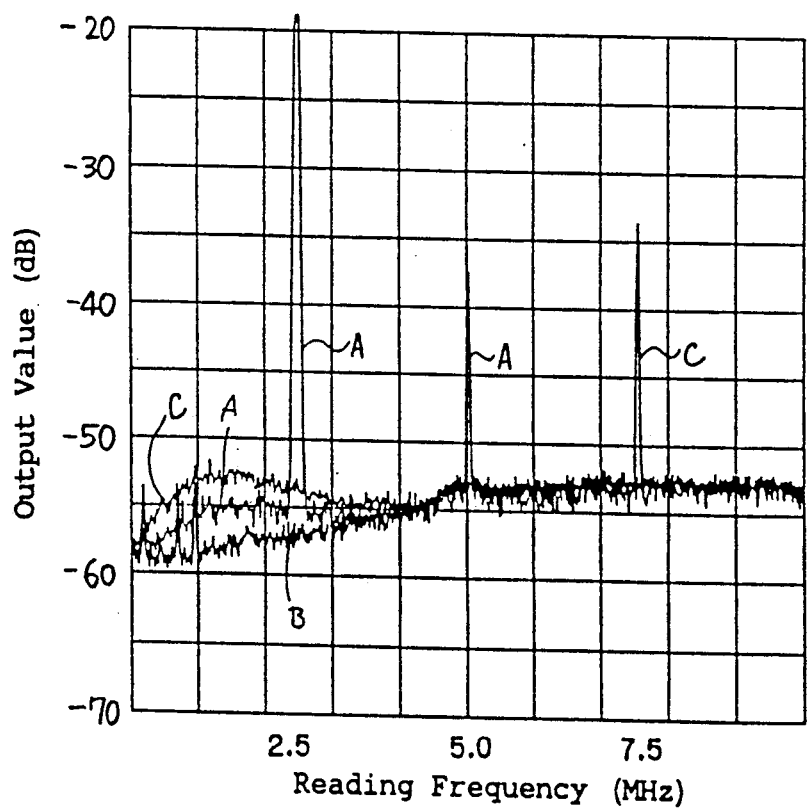
Figure 3:
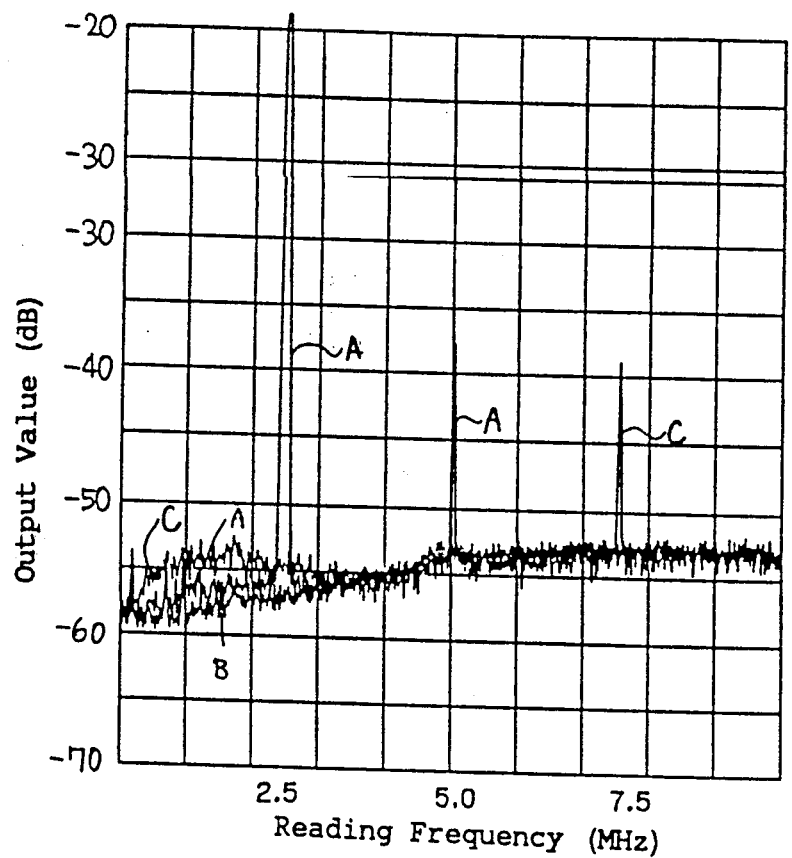
Figure 4:
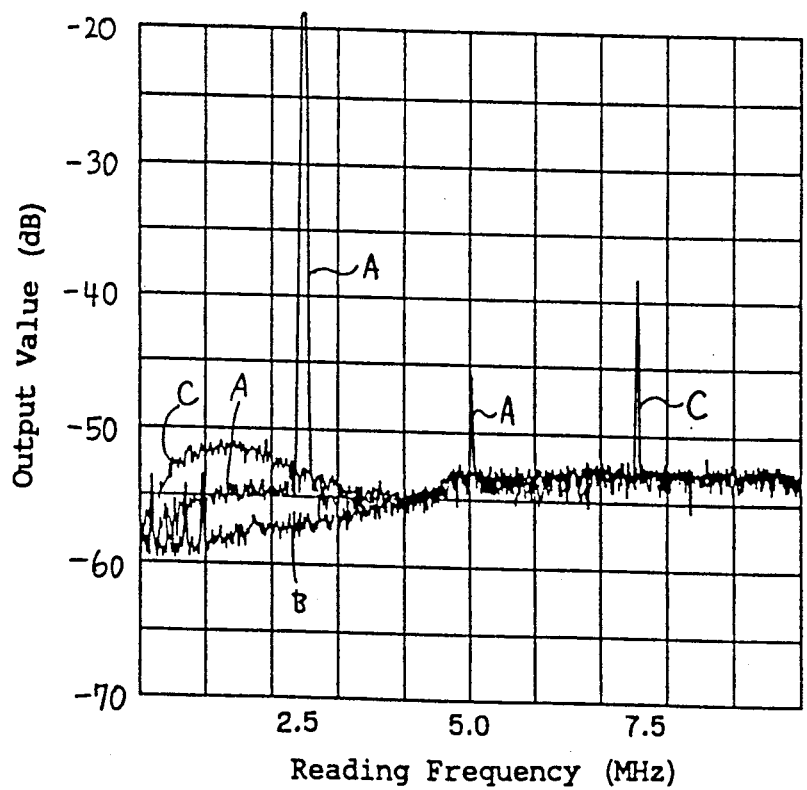
Figure 5:
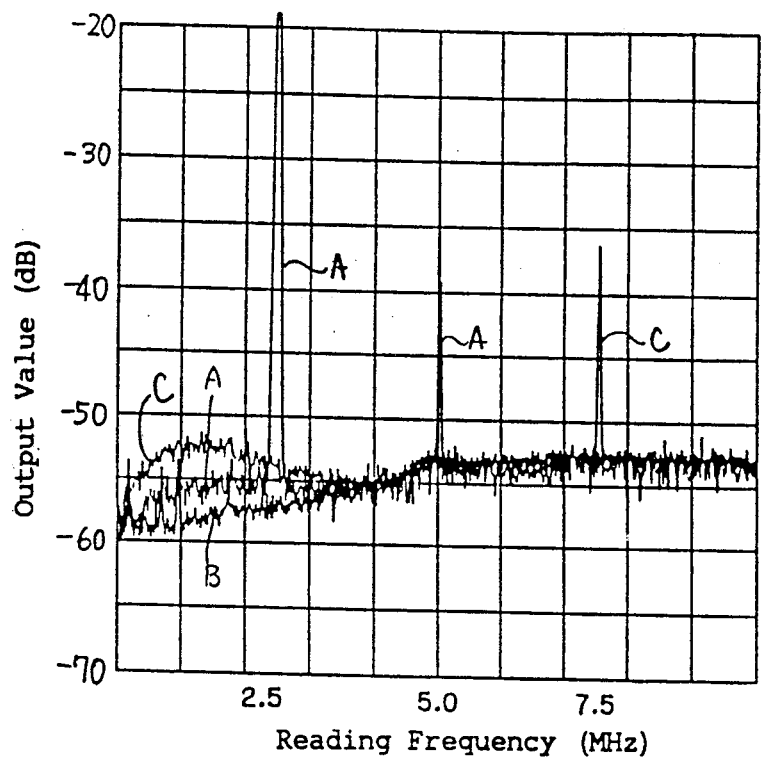

| No. | Composition of magnetic film | Br. & (Gμ) | Hc (Oe) | Noise level |
|---|---|---|---|---|
| 1 | $(Co_{70}Ni_{30})_{90}Cr_5P_5$ | 613 | 745 | Low (FIG. 1) |
| 2 | $(Co_{80}Ni_{20})_{94}Cr_3P_3$ | 588 | 755 | Low (FIG. 2) |
| 3 | $(Co_{80}Ni_{20})_{90}Cr_7P_3$ | 590 | 750 | Low (FIG. 3) |
| 4 | $(Co_{95}Ni_5)_{91}Cr_2P_7$ | 610 | 770 | Low (FIG. 4) |
| 5 | $(Co_{80}Ni_{20})_{88}Cr_{10}P_2$ | 595 | 740 | Low (FIG. 5) |
| 6 | $Co_{70}Ni_{30}$ | 620 | 760 | High (FIG. 6) |
| 7 | $(Co_{70}Ni_{30})_{95}Cr_5$ | 600 | 740 | High (FIG. 7) |
| 8 | $(Co_{70}Ni_{30})_{95}P_5$ | 605 | 750 | High (FIG. 8) |

(2) Noise characteristics test

Signals were recorded in each of magnetic discs Nos. 1 to 8 and then reproduced to obtain a background noise spectrum, which was analyzed y a spectrum analyzer. The testing conditions were as follows.

| | | |
|---|---|---|
| (i) Head: | 3370 monolithic type | |
| (ii) Amount of lift of head: | 0.25 μm | |
| (iii) Width of track: | 18 μm | |
| (iv) Length of gap: | 0.9 μm | |
| (v) Recording current: | 45 mA p-p | |
| (vi) Recording frequency: | 2.5 MHz and 7.5 MHz | |
| (vii) Recording position: | r = 31.5 mm | |
| (viii) Speed of rotation of disc: | 3600 r.p.m. | |
| (ix) Spectrum analyzer: | central frequency 5 MHz, frequency span 10 MHz, resolution 30 KHz | |

The results are shown in FIGS. 1 to 8, in which the reading frequency (MHz) is plotted as abscissa vs. the output value (dB) as ordinate. Curve A in the diagram represents the modulation noise having the recording frequency 2.5 MHz, and Curve B the system noise. Curve C represents also the modulation noise having the recording frequency 7.5 MHz. The smaller the area surrounded by Curves A and B, or Curves C and B, the lower is the noise level.

Figure 6:
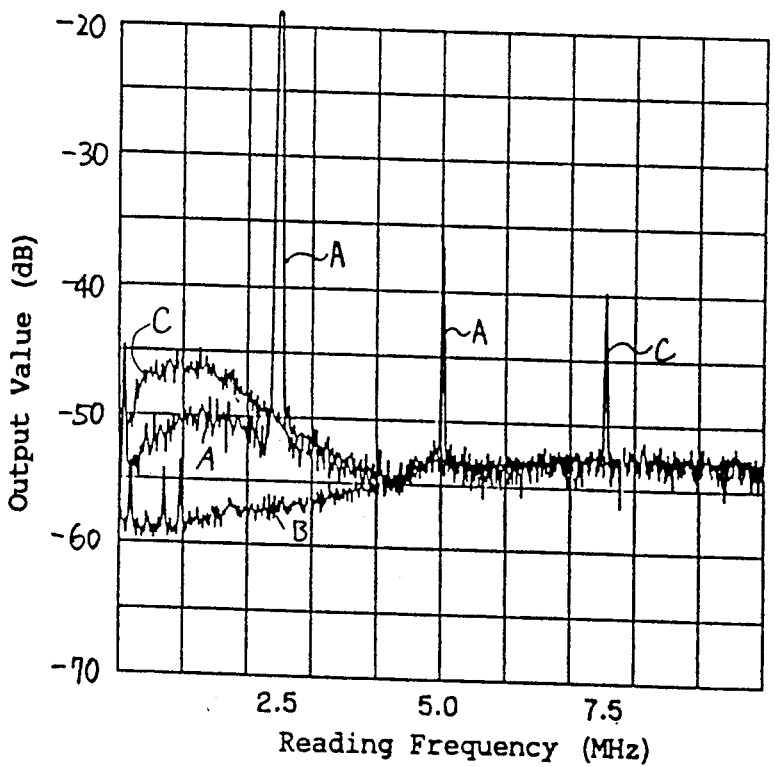
FIGS. 6 to 8 are graphs showing the noise characteristics of other magnetic discs prepared for comparison and serving as magnetic recording media.
Figure 7:
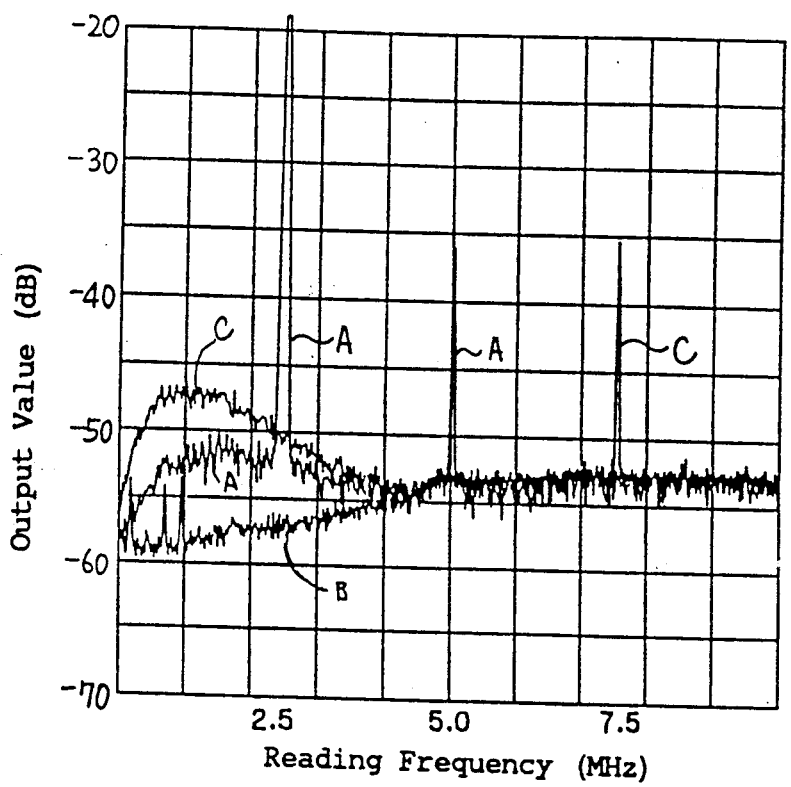
Figure 8:
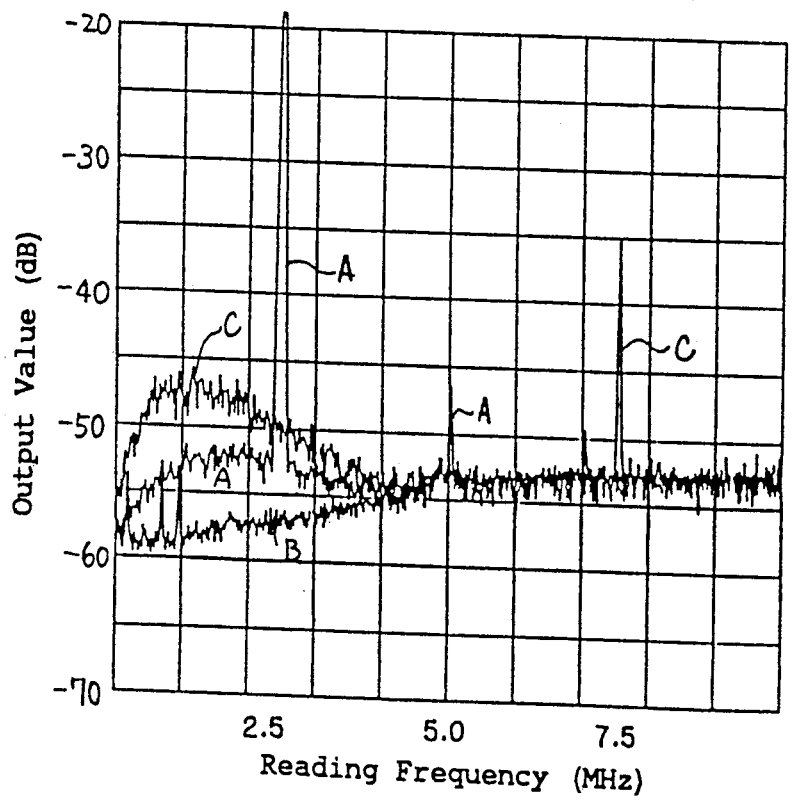

The results achieved by magnetic discs Nos. 1 to 5 including the magnetic film of the invention are shown in FIGS. 1 to 5, respectively, that achieved by magnetic disc No. 6 including the conventional magnetic film in FIG. 6, and those by magnetic discs Nos. 7 and 8 each including the comparative magnetic film in FIGS. 7 and 8, respectively. Based on the result, the noise level was evaluated as listed in Table 1, right column.

These results indicate that the examples of the invention, Nos. 1 to 5 are lower in noise level than the conventional example and the comparative examples, Nos. 6 to 8 which are comparable to the former in magnetic properties. The magnetic film of the invention is therefore amenable to recording with a higher density.

A comparison between Nos. 1 to 5 and Nos. 7 and 8 reveals that the excellent low-noise characteristics of the invention can not be afforded by the presence of only one of Cr and P but can be realized only when both the elements Cr and P are present.

The magnetic recording medium of the thin metal film type of the present invention has the excellent magnetic properties of the conventional magnetic film of Co—Ni alloy, further possesses the low-noise characteristics which are not available with the conventional Co—Ni alloy magnetic film, is therefore useful for higher-density magnetic recording and can be provided in a compacted form with a higher quality to exhibit improved performance.

What is claimed is:

1. A magnetic recording medium comprising a substrate and a magnetic film on the substrate having the following ingredients present in the following ingredients present in the following atomic percentages Co: 63 to 75.2%, Cr: 3 to 10%, Ni: 17.6 to 27% and P: 2 to 5%.

* * * * *